United States Patent
Barillot et al.

(10) Patent No.: US 12,000,463 B2
(45) Date of Patent: Jun. 4, 2024

(54) TRANSMISSION GEARBOX FOR TRUCK ELECTRIC DRIVE AXLE

(71) Applicant: Volvo Truck Corporation, Gothenburg (SE)

(72) Inventors: Thomas Barillot, Mornant (FR); Jean Terrat, Malleval (FR); Bertrand Cauvin, Reyrieux (FR); Serge Vananty, Chassieu (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/772,016

(22) PCT Filed: Nov. 15, 2019

(86) PCT No.: PCT/EP2019/081534
§ 371 (c)(1),
(2) Date: Apr. 26, 2022

(87) PCT Pub. No.: WO2021/093973
PCT Pub. Date: May 20, 2021

(65) Prior Publication Data
US 2022/0373064 A1 Nov. 24, 2022

(51) Int. Cl.
*F16H 3/091* (2006.01)
*F16H 57/021* (2012.01)
(Continued)

(52) U.S. Cl.
CPC ........... *F16H 3/091* (2013.01); *F16H 57/021* (2013.01); *F16H 57/023* (2013.01);
(Continued)

(58) Field of Classification Search
CPC ...... F16H 3/091; F16H 57/021; F16H 57/023; F16H 2057/02034; F16H 2057/02052;
(Continued)

(56) References Cited

U.S. PATENT DOCUMENTS 4,485,692 A 12/1984 Moore et al.
9,409,477 B2 8/2016 Wang
(Continued)

FOREIGN PATENT DOCUMENTS

DE 578901 C 6/1933
DE 102013206176 A1 * 10/2014 ............. B60K 6/365
(Continued)

OTHER PUBLICATIONS

English translation of DE 102013206176A1 (Year: 2014).*
(Continued)

*Primary Examiner* — Victor L Macarthur
(74) *Attorney, Agent, or Firm* — Sage Patent Group

(57) ABSTRACT

A gearbox for a vehicle includes a primary shaft configured to rotate about a first axis, a distribution gear, a transmission gear arranged around the primary shaft, an auxiliary shaft configured to rotate around a second axis, an auxiliary output gear and an auxiliary transmission gear arranged around the auxiliary shaft, an output gear arranged around the primary shaft for transmitting a power out of the gearbox, and a gear shift system slidable between at least two positions. The gear shift system is configured to rotationally engage the distribution gear and the output gear for transmitting the power directly from the primary shaft to the output gear, or the distribution gear and the transmission gear for transmitting the power indirectly from the primary shaft to the output gear through the auxiliary shaft.

17 Claims, 8 Drawing Sheets

(51) Int. Cl.
*F16H 57/023* (2012.01)
*F16H 57/02* (2012.01)

(52) U.S. Cl.
CPC .............. *F16H 2057/02034* (2013.01); *F16H 2057/02052* (2013.01); *F16H 2057/02086* (2013.01); *F16H 2200/0021* (2013.01); *F16H 2200/0034* (2013.01); *F16H 2200/0039* (2013.01)

(58) Field of Classification Search
CPC ... F16H 2057/02086; F16H 2200/0021; F16H 2200/0034; F16H 2200/0039; F16H 3/0915; F16H 3/006; B60K 1/02; B60K 2001/001; B60K 17/08; B60K 1/00; B60K 17/02; B60K 17/16; B60K 17/06; Y02T 10/62
See application file for complete search history.

(56) References Cited

U.S. PATENT DOCUMENTS

| | | |
|---|---|---|
| 2012/0073394 A1 | 3/2012 | Ren et al. |
| 2013/0345008 A1* | 12/2013 | Torrelli ............... B60K 6/547 475/5 |

FOREIGN PATENT DOCUMENTS

| | | |
|---|---|---|
| GB | 1197345 A | 7/1970 |
| GB | 2083579 A | 3/1982 |

OTHER PUBLICATIONS

"True Gear & Spline", dated Feb. 20, 2019, obtained from the interenet on Nov. 13, 2023 at "https://true-gear.com/spline-shaft-basics-101/blog.html" (Year: 2019).*

International Search Report and Written Opinion of the International Searching Authority, PCT/EP2019/081534, dated Jul. 16, 2020, 14 pages.

* cited by examiner

TRANSMISSION GEARBOX FOR TRUCK ELECTRIC DRIVE AXLE

CROSS REFERENCE TO RELATED APPLICATIONS

This application is a 35 U.S.C. § 371 national stage application of PCT International Application No. PCT/EP2019/081534 filed on Nov. 15, 2019, the disclosure and content of which is incorporated by reference herein in its entirety.

FIELD OF THE INVENTION

This invention relates to a gearbox for use in a vehicle and to a powertrain assembly for use in a vehicle. More particularly, the invention relates to a gearbox and powertrain assembly driven by an electric motor for use in an electric vehicle, a hybrid vehicle or a trailer to be towed by a vehicle.

The invention can be applied in heavy-duty vehicles, such as trucks, buses and construction equipment. Although the invention will be described with respect to a truck, the invention is not restricted to this particular vehicle, but may also be used in other vehicles such as passenger cars.

BACKGROUND OF THE DISCLOSURE

In the field of the transport industry, there is a need to deal with emissions regulation requirements which are becoming more and more demanding, and cities suffering from a high volume of traffic start to forbid internal combustion engine vehicles in their city centers.

Vehicles and more particularly electric/hybrid vehicles such as electric/hybrid buses and trucks typically use an electric motor for running one or more wheels through a drive wheel shaft (or a drive wheel axle). Typically, an axle includes two drive wheel shafts, one for each driving wheel. Most of the electric motors are, however, designed to run at high-speed/low-torque condition as compared with known internal combustion engines running at high-torque/low-speed condition.

Fulfilling the torque demand at the wheel(s) of a vehicle is important for startability of a vehicle in different conditions, e.g. in slopes. There is thus need for having a wide-gear reduction ratio through a gearbox/powertrain assembly (which can be typically between e.g. 1:20-1:50). Such a wide-gear reduction ratio is commonly fulfilled via a gearbox with several reduction stages which consequently needs more space and leaves a limited volume of space for other parts (e.g. space needed for batteries, body/aerodynamic devices, suspension assemblies) of a vehicle. Moreover, the commonly known gearboxes are also heavy which further reduces the vehicle's moving capabilities and limits the autonomy of the vehicle. A problem thus arises when a gearbox/transmission assembly is implemented into an electric/hybrid vehicle. Unlike the standard transmission systems for Gasoline/diesel engines where the transmission can be positioned in different manners and connected to the drive shaft through a shaft assembly (e.g. rear-drive trucks/buses), in case of the electric/hybrid vehicles, there is a need to accommodate an electric motor and the gearbox in the vicinity of the drive wheel axle. Typically, if the electric motor distributes power to the drive wheel axle, a differential assembly is usually needed to distribute the different power/torque to each wheel through the associated drive wheel shaft. On the other hand, in case the electric motor is connected and distributes the power directly to the drive wheel shaft (even through a gearbox), no differential assembly is usually needed but there is a requirement to have one electric motor for each drive wheel shaft (at least two electric motors then).

To follow the above configuration, the space required for accommodation a gearbox/transmission assembly in an electric/hybrid vehicle is further limited by a suspension assembly.

An example of prior art is, for instance, U.S. Pat. No. 9,409,477 disclosing a transmission system for an electric vehicle. The transmission system is defined by an input shaft engaged to a drive motor and an output shaft engaged to a differential. Each of the input and output shafts has a different rotational axis and the system as such lacking compactness and is demanding for a limited volume of space available in an electric vehicle.

Therefore, as further described in the detailed description of the invention, the inventors have endeavored to find a solution for providing a small/compact gearbox which is also light as compared to the known gearboxes/transmission assemblies.

SUMMARY OF THE DISCLOSURE

It is to these drawbacks that the invention intends to remedy.

In this respect, the invention concerns a gearbox for a vehicle comprising:
- a primary shaft configured to rotate around a first axis,
- a distribution gear which is fixed in rotation with the primary shaft;
- a transmission gear, which is configured to rotate around the first axis and which is arranged around the primary shaft;
- an auxiliary shaft configured to rotate around a second axis, the first axis and the second axis being distant from each other,
- an auxiliary output gear and an auxiliary transmission gear which are arranged around the auxiliary shaft, said auxiliary transmission gear being engaged to the transmission gear;
- an output gear for transmitting a power out of the gearbox, said output gear being independently and rotationally arranged around the primary shaft and being configured to rotate around the first axis, said output gear being engaged to the auxiliary output gear;
- a gear shift system slidable between at least two positions, said gear shift system being configured to rotationally engage:
  - the distribution gear and the output gear for transmitting the power directly from the primary shaft to the output gear, or
  - the distribution gear and the transmission gear for transmitting the power indirectly from the primary shaft to the output gear through the auxiliary shaft.

Thanks to this arrangement, the output gear and the primary shaft rotate around the same axis. Therefore, it is possible to have a compact and small gearbox suitable to vehicles where the available space is limited due to strict spacing restrictions (e.g. an electric vehicle—set of batteries, suspension assembly). The compactness of the gearbox is achieved by the output gear which is disposed on the primary shaft and can rotate at either the same speed or a different rotational speed as the primary shaft—depending on the position of the gear shift means. Therefore, the above arrangement enables to avoid having two different shafts for transmitting power in and out the gearbox.

Furthermore, it is possible to provide two or more gear stages through additional transmission gears and auxiliary transmission gears, while the output gear remains substantially at the same position with respect to the auxiliary shaft. That is, the distance between the primary shaft and the auxiliary shaft remains unchanged when one or more additional gear stages are added.

This compact solution incorporating at least two stages offers satisfactory requirements ensuring different performances (high-torque/low-speed demand during start conditions and/or high-speed/low-torque demand during cruising conditions) resulting from different drive modes (gear current selection) of a vehicle.

Advantageously, the gearbox includes additional features, which can be considered alone or in combination, and among which:

The distribution gear is rigidly fixed to, or integral with the primary shaft.

At least the auxiliary transmission gear or the auxiliary output gear is rigidly fixed to, or integral with the auxiliary shaft.

Alternatively, as an example, the auxiliary shaft can be rigidly fixed to a gearbox casing and the at least one auxiliary transmission gear and the auxiliary output gear can be configured to rotate around said fixed auxiliary shaft. Further, as an example, the at least one auxiliary transmission gear and the auxiliary output gear can be mounted via at least an auxiliary roller bearing around the fixed auxiliary shaft (rigidly fixed to a gearbox casing). The roller bearings disposed between the gearbox casing and the primary shaft enable to withstand high torque values and to minimize wear.

The primary shaft has first and second axial ends and is rotationally mounted within a gearbox casing via a first primary roller bearing arranged at a first axial end and via a second primary roller bearing arranged at a second axial end.

An axial length of the gearbox, measured along the first axis, is less than 400 mm. This axial length of less than 400 mm defines high compactness of the gearbox which can be accommodated in various types of electric/hybrid vehicles where the strict space requirements are key features.

The output gear is mounted via at least one output roller bearing on the primary shaft.

Thanks to this arrangement, the output gear can rotate around the same first axis as the primary shaft. The rotational speed of the output gear may differ compared to the rotational speed of the primary shaft, depending on the position of the gear shift means. The variable rotational speed of the output gear around the primary shaft is achieved by the output roller bearing which is capable to withstand high torque demand needed during the starting condition of a vehicle, and high power during cruise operation. The reliability and lifetime of the gearbox are thus improved, and maintenance needs are also minimized.

The transmission gear is mounted via at least one roller bearing on the primary shaft, preferably via at least one needle bearing.

The needle bearing disposed between the transmission gear and the primary shaft provides enhanced space limitation since needle bearing requires less space than other known types of bearings and furthermore, provides enough strength to withstand the speed/torque demand of the gearbox in case of indirect configuration (the power from the electrical motor is transmitted from the primary shaft to the output gear through the auxiliary shaft via the transmission gear).

The auxiliary shaft is rotationally mounted within a gearbox casing via at least one auxiliary roller bearing.

The gearbox further includes a primary input ring which is fixed in rotation with the primary shaft.

The ratio between the rotational speed of the primary shaft and the rotational speed of the output gear can be selected between a first gear ratio when the distribution gear and the output gear are rotationally engaged, and a second gear ratio when the distribution gear and the transmission gear are rotationally engaged, wherein the second gear ratio is higher than the first gear ratio.

The gear shift system is further configured to be positioned in engagement only with the distribution gear to define a first neutral position, in which no power can be transmitted between the primary shaft and the output gear.

Thanks to this arrangement, the gearbox can be switched to the neutral position (first neutral position defined by the gear shift means) which provides a free movement of the drive wheel shafts/axle for towing or servicing a vehicle/trailer.

The gearbox further comprises a second distribution gear being integral with the primary shaft, a second transmission gear being rotatably mounted on the first axis and disposed on the primary shaft, a second auxiliary transmission gear being disposed on said auxiliary shaft and engaged to the second transmission gear and a second gear shift means slidable between at least two positions, said second gear shift means being configured to rotationally engage solely the second distribution gear to define a second neutral position, said second neutral position transmitting no power between the primary input gear and the output gear through the second distribution gear or the second distribution gear and the second transmission gear for transmitting the power indirectly from the primary shaft to the output gear through the auxiliary shaft, wherein said gear shift means is configured to be positioned in said first neutral position.

This configuration of the gearbox provided with the second gear shift means enables to have more than two gear stages for further reduction/increase of the rotational speed of the output gear which can offer satisfactory requirements ensuring different performance (high-torque/low-speed demand during start conditions and/or high-speed/low-torque demand during cruising conditions) resulting from different drive modes (gear current selection) of a vehicle.

The gearbox is capable of transmitting a power of at least 250 kW, preferably at least 300 kW and wherein the gearbox is capable of transmitting a torque of at least 600 N·m., preferably at least 750 N·m.

The gear shift means and/or second gear shift means comprises a shift sleeve.

At least one of the gears is a helical gear.

Thanks to this arrangement, it is possible to effectively reduce noise generated by the gearbox during operation.

The invention also concerns a powertrain assembly for a vehicle comprising a gearbox as defined above, at least one electric motor being configured to be engaged to the primary input gear of the gearbox, a differential gear having a differential ring wheel, said differential ring wheel being engaged to the output gear of the gearbox and a drive wheel axle being coupled to the differential gear.

Eventually, the invention relates to a vehicle, comprising a powertrain assembly as defined above.

Preferably, the vehicle is a heavy-duty vehicle, such as a truck, a bus or a construction machine. It can be one of an electric vehicle, a hybrid vehicle or a trailer to be towed.

BRIEF DESCRIPTION OF THE DRAWINGS

Other features and advantages of the invention appear from the following detailed description of some of its embodiments, given by way of non-limiting example, and with reference to the accompanying drawings, in which.

DETAILED DESCRIPTION OF THE DISCLOSURE

In the figures, the same references denote identical or similar elements, unless stated otherwise.

Figure 1:
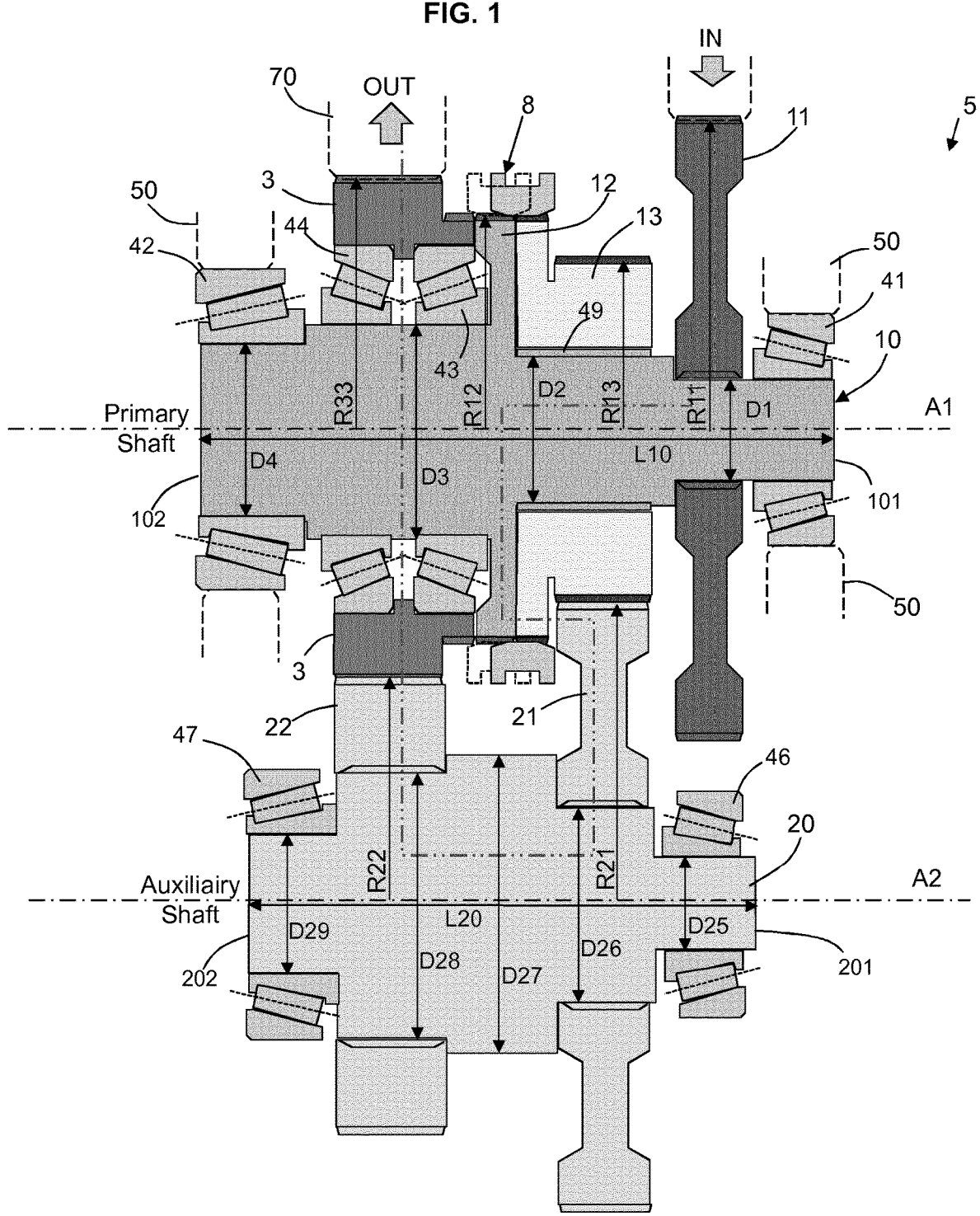
FIG. 1 shows a cross-sectional view of the gearbox of one embodiment of the present disclosure.

FIG. 1 shows a cross-sectional view (longitudinal section) of the gearbox 5 of one embodiment of the present disclosure. The gearbox 5 comprises a primary shaft 10 and an auxiliary shaft 20 (a.k.a "countershaft"). The primary shaft 10 is configured to transmit the power in the gearbox 5.

The primary shaft 10 is configured to rotate around a first axis A1 and the auxiliary shaft 20 is configured to rotate around a second axis A2. The first axis A1 and the second axis A2 are configured as being distant from each other. That is, the first axis A1 and the second axis A2 are distant (being spaced) from each other in a plane, which is substantially vertical in one given example. In the example, the first axis A1 and the second axis A2 are parallel to each other.

Advantageously, a primary input ring 11 is fixed in rotation with the primary shaft 10. In the example of the figures, the primary input gear 11 is mounted on the primary shaft 10 (i.e. around the primary shaft 10) and is therefore rigidly fixed to the primary shaft 10 (forming then two pieces). Alternatively, the primary input ring 11 could be also integral with the primary shaft 10 (forming then one piece). The primary input ring 11 is then arranged so that the power is transmitted to the primary shaft 10 through a radial direction (See arrow "IN" on FIGS. 1 and 2) with respect to axis A1.

The rotational speed of the primary shaft 10 is the same than that of the primary input ring 11.

Preferably, the primary input ring 11 is configured to be driven by an electric motor (not shown) by means of rotational engagement between the primary input ring 11 and a rotor of the electric motor. In a variant not shown, another type of motor, such as an ICE, could be used as the power source driving the gearbox 5. Preferably, the electric motor is a DC motor, for example a BLDC motor (brushless direct current motor).

Advantageously, there is a ratio of reduction between the rotating shaft of the motor (whatever it is) and the primary shaft 10, meaning that the rotating shaft of the motor is not directly coupled with the primary shaft 10.

The primary input ring 11 is optional as a coupling (not shown) could be used to connect one longitudinal end of the primary shaft 10 to the longitudinal end of a driving shaft, such as a rotating shaft of a motor (e.g. rotor or camshaft). For example, a keyed joint or a Cardan joint could be used to connect the primary shaft to the driving shaft. This means that, in this variant not shown, the power could be transmitted to the primary shaft 10 through the axial direction (i.e. along axis A1). This also means that, in one embodiment, there is no speed reduction between the rotating shaft of the motor (whatever it is) and the primary shaft 10.

In the example, the primary input ring 11 is a gear element (or pinion), meaning that it meshes with another ring gear (not shown). Among these two meshing gears, the primary input gear 11 is the driven gear, while said other ring gear is the driving gear. Alternatively, ring 11 could also be a pulley connected to a belt (pulley-belt system) or a sprocket connected to a chain (roller chain system). This means that ring 11 does not necessarily includes external teeth.

A distribution gear 12 is fixed in rotation with the primary shaft 10. In the example, the distribution gear 12 is integral with the primary shaft 10 (forming then one piece). However, in an alternative embodiment (not shown), the distribution gear 12 could be distinct from the primary shaft 10 (forming then two pieces). In this case, the distribution gear 12 would be arranged around the shaft 10 and rigidly fixed (or secured) to shaft 10.

The distribution gear 12 is configured to transfer a power from the primary shaft 10 to either an output gear 3 (for outputting the power out of the gearbox 5) or to a transmission gear 13.

The output gear 3 is configured to transmit the power out of the gearbox 5. The output gear 3 is independently and rotationally disposed around the primary shaft 10 such that the output gear 3 rotates around the same first axis A1 as the primary shaft 10. The output gear 3 can freely rotate around the primary shaft 10. The rotational speed of the output gear 3 can be the same than that of the primary shaft 10 or different, depending on the selected drive mode (e.g. neutral, $1^{st}$ gear, $2^{nd}$ gear, etc.) In various embodiments, the output gear 3 can be engaged to a differential assembly (70—e.g. a differential ring wheel) for transmitting the power to one, two or several drive wheel axles T, depending on the type of vehicle.

Figure 11:
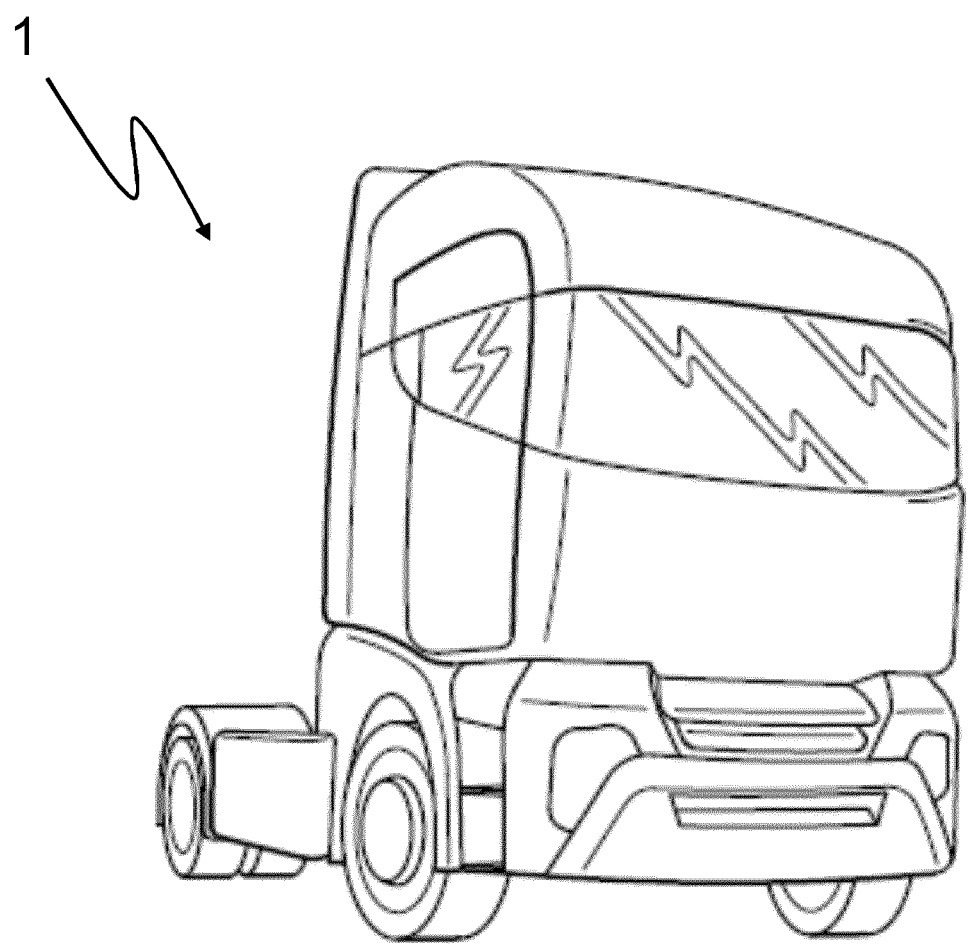
FIG. 11 shows a schematic view of a vehicle, in particular a truck, comprising the gearbox of the invention.

In the example, and as shown on FIG. 11, the vehicle 1 is a truck. Alternatively, it can be a bus or a construction machine.

In operation, the primary input gear 11 and the output gear 3 rotate around the same axis, that is the first axis A1 as the output gear 3 is disposed on the primary shaft 10. Therefore, it is possible to have a compact and small gearbox applicable to vehicles where the required space is limited due to strict spacing restrictions (e.g. an electric vehicle—set of batteries, suspension assembly, etc.).

Preferably, the output gear 3 is mounted around the primary shaft 10 via at least an output roller bearing, preferably two output roller bearings 43 and 44. Such configuration enables the output gear 3 rotating around the same first axis A1 as the primary shaft 10. The rotational speed of the output gear 3 may be the same or can differ compared to the rotational speed of the primary shaft 10. The variable rotational speed of the output gear 3 around the primary shaft 10 is achieved by the at least output roller bearing (43, 44) which is capable to withstand high torque transmission, in particular during the start of the vehicle. The reliability and lifetime of the gearbox are thus improved, and maintenance needs are also minimized.

Advantageously, the transmission gear 13 is configured to rotate around the first axis A1 and is disposed on the primary shaft 10.

In the example, the transmission gear 13 can freely rotate (i.e. is free to rotate) around the primary shaft 10 (and inversely).

The transmission gear 13 can have either the same, or a different rotational speed than that of the primary shaft 10, depending on the selected gear ratio.

Preferably, the transmission gear 13 is mounted around the primary shaft 10 via at least one roller bearing, preferably a needle bearing 49. This needle bearing 49, disposed between the transmission gear 13 and the primary shaft 10, provides enhanced space limitation since needle bearing 49 requires less space than other known types of bearings and, furthermore, provides enough strength to withstand the speed/torque demand of the gearbox 5.

In various embodiments, the number of the transmission gear 13 can differ, depending on a number of gear stages disposed within the gearbox 5. FIG. 1 shows the embodiment with one transmission gear 13. An example of another embodiment showing more gear stages can be seen in FIG. 4 and will be explained later (showing a second distribution gear 14 and a second transmission gear 15).

Preferably, gearbox 5 also includes an auxiliary output gear 22. Said auxiliary output gear 22 is preferably fixed in rotation with the auxiliary shaft 20. In the example of the figures, the auxiliary output gear 22 is mounted on the auxiliary shaft 20 (i.e. around the auxiliary shaft 20) and is therefore rigidly fixed to the auxiliary shaft 20 (forming then two pieces). Alternatively, the auxiliary output gear 22 could be also integral with the auxiliary shaft 20 (forming then one piece).

Besides, gearbox 5 also includes an auxiliary transmission gear 21. Said auxiliary transmission gear 21 is, in the example, fixed in rotation with the auxiliary shaft 20. In the example of the figures, the auxiliary transmission gear 21 is mounted on the auxiliary shaft 20 (i.e. around the auxiliary shaft 20) and is therefore rigidly fixed to the auxiliary shaft 20 (forming then two pieces). Alternatively, the auxiliary transmission gear 21 could be also integral with the auxiliary shaft 20 (forming then one piece).

Advantageously, the auxiliary transmission gear 21 is engaged to the transmission gear 13. As stated above, in various embodiments having a different number of the transmission gears 13, the number of the auxiliary transmission gear 21 can also differ (e.g. the embodiment of FIG. 4). The auxiliary transmission gear 21 and the auxiliary output gear 22 rotate around the second axis A2 at the same speed as the auxiliary shaft 20.

Alternatively, in another embodiment not shown in the Figures, the auxiliary shaft 20 can be rigidly fixed within the gearbox 5 (e.g. to a gearbox casing 50). In other words, the shaft 20 can be non-rotating (fixed). In such configuration, the auxiliary transmission gear 21 and the auxiliary output gear 22 can be rotatably mounted (i.e. are free to rotate) around the rigidly fixed auxiliary shaft 20, via roller bearings.

Therefore, the auxiliary transmission gear 21 and the auxiliary output gear 22 are either fixed in rotation with shaft 20 or free to rotate relative to shaft 20.

The gearbox 5 further comprises a gear shift system 8. The gear shift system 8 is configured to be slidable along the axis A1 (axially) between at least two positions. The two positions can be defined as different engagement configurations between the distribution gear 12 of the primary shaft 10 and either the output gear 3 or the at least one transmission gear 13.

Figure 2:
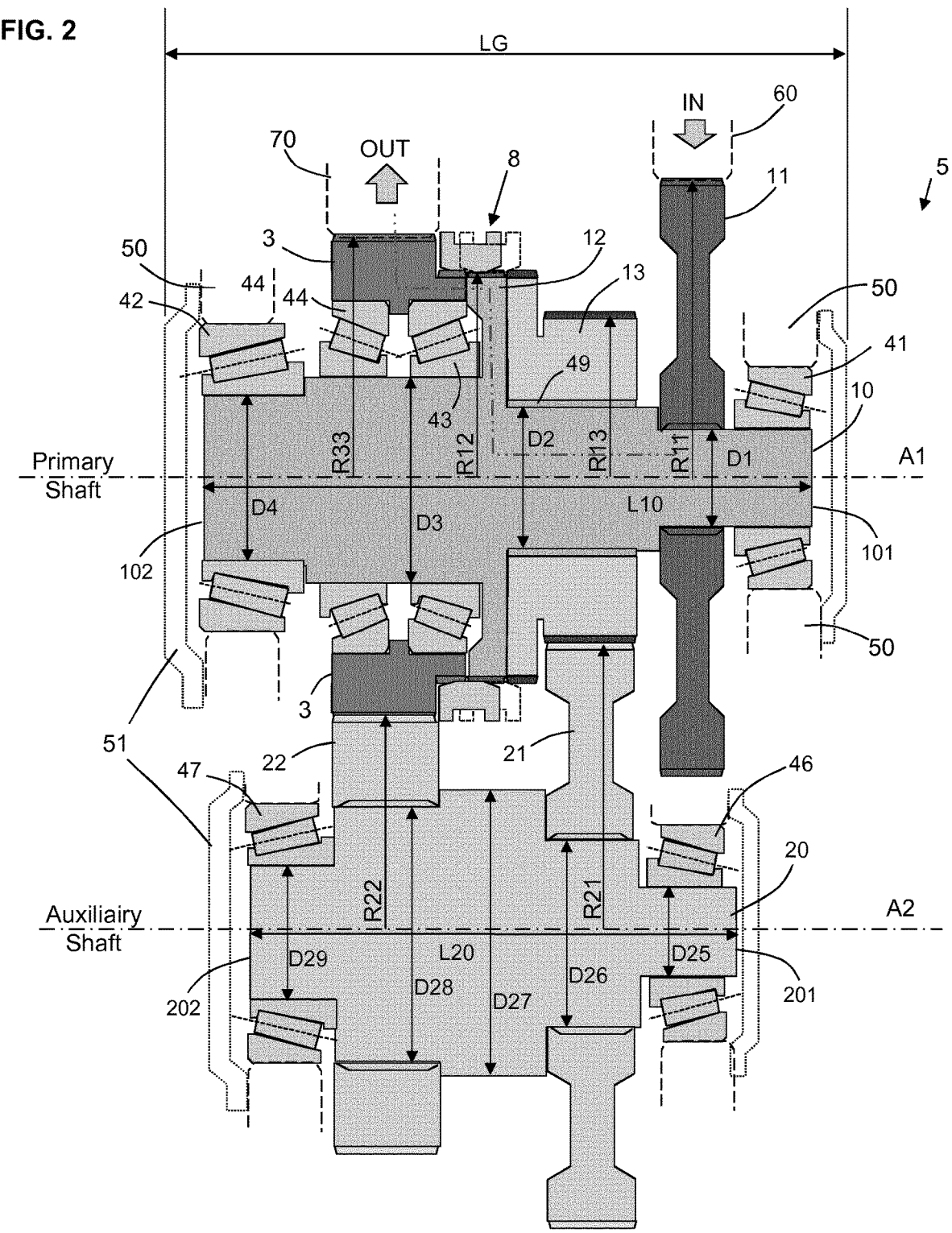
FIG. 2 shows a cross-sectional view of the gearbox of FIG. 1 in a different configuration.

The first configuration can be seen in FIG. 2, where the gear shift system 8 is shifted from an initial position (dashed line) to the left to rotatably engage the distribution gear 12 and the output gear 3. In this first configuration, the rotational speed of the output gear 3 is the same as the rotational speed of the distribution gear 12 of the primary shaft 10. The power in the first configuration is distributed directly from the primary shaft 10 (connected to the electric motor 6) to the output gear 3. The power of the electric motor (not shown) is thus transmitted radially through the primary input gear 11 to the primary shaft 10 and then transmitted axially through the distribution gear 12 directly to the output gear 3 and then to the differential assembly (e.g. to the differential ring wheel 70). The described transmission of power is depicted in FIG. 2 in dashed-dotted line which follows the transmission of power as follows: (IN) electric motor (not shown)→primary input gear 11→primary shaft 10→distribution gear 12→gear shift system 8→output gear 3→OUT (differential assembly).

In the first configuration of the gear shift system 8 as described above, the rotational speed of the output gear 3 is the same as rotational speed of the primary shaft 10. Typically, such configuration can be selected in cruise conditions (high-speed/low-torque).

The second configuration is depicted in FIG. 1 and shows the rotational engagement of the distribution gear 12 and the transmission gear 13. As shown in FIG. 1, the gear shift system 8 is shifted from an initial position (dashed line) to the right to rotatably engage the distribution gear 12 and the transmission gear 13. In this so-called second configuration, the rotational speed of the transmission gear 13 is the same as the rotational speed of the distribution gear 12. The power in the second configuration is distributed indirectly from the primary shaft 10 (connected to the electric motor) to the output gear 3, through the auxiliary shaft 20.

The power of the electric motor (not shown) is thus transmitted radially through the primary input gear 11 to the primary shaft 10, then axially to the transmission gear 13 (through the distribution gear 12 and via the gear shift system 8) and then, the power is distributed from the auxiliary transmission gear 21 (rotatably engaged to the transmission gear 13) to the auxiliary output gear 22 via the auxiliary shaft 20. Finally, the power is transmitted from the auxiliary output gear 22 to the output gear 3 and then radially to the differential assembly (e.g. to the differential ring wheel 70). The described transmission of power is depicted in FIG. 1 in dashed-dotted line which follows the transmission of power as follows: (IN) electric motor (not shown)→primary input gear 11→primary shaft 10→distribution gear 12→gear shift system 8→transmission gear 13→auxiliary transmission gear 21→auxiliary shaft 20→auxiliary output gear 22→output gear 3→OUT (differential assembly).

In the second configuration of the gear shift system 8 as described above, the rotational speed of the output gear 3 is reduced compared to the rotational speed of the primary shaft 10 through the auxiliary shaft 20. Such configuration can be selected in high-torque/low-speed conditions.

Additionally, a gear ratio can be defined as the ratio (or quotient) between the rotational speed of the primary input gear 11 and the rotational speed of the output gear 3. In the first configuration of the gear shift system 8, i.e. when there is a direct engagement between the distribution gear 12 and the output gear 3, the gear ratio is equal to a first gear ratio, which is 1:1.

Further, the second configuration of the gear shift system 8 defines the indirect engagement between the distribution gear 12 and the output gear 3 through the auxiliary shaft 20. In this second configuration, the gear ratio is equal to a second gear ratio.

Advantageously, the second gear ratio (indirect engagement) is higher than the first gear ratio (direct engagement).

However, in an alternative embodiment, the second gear ratio could be lower than the first gear ratio. This means that, instead of being reduced, the rotational speed of the primary input gear is amplified (overdrive).

Optionally, the gear shift system 8 can be further configured to be positioned only in engagement with the distribution gear 12. In such configuration, the gear shift system 8 does not have any engagement configuration with either the output gear 3 or with the transmission gear 13. This configuration can be defined as a neutral position (e.g. a first neutral position with respect to further gear stages defined in FIG. 4). In the (first) neutral position, the gear shift system 8 is configured to transmit no power between the primary input gear 11 and the output gear 3 since no physical engagement between these gears (3, 12, 13) is provided. The (first) neutral position can represent a third position of the gear shift system 8, as an additional option to the direct (the first configuration) and indirect (the second configuration) engagements. The (first) neutral position of the gear shift system 8 can provide free movement of a vehicle, such as a free movement of the drive wheel shafts/axle for towing or servicing a vehicle/trailer. Further, with respect to FIG. 1 and FIG. 2, the (first) neutral position of the gear shift system 8 is shown in the dashed line where the position of the gear shift system 8 corresponds to the position of the distribution gear 12.

Additionally, the gear shift system 8 can be a type of clutch sleeve (a.k.a "shift sleeve") or any suitable type of dog clutch for performing gear change in the gearbox 5. As known per se, thus not detailed therein, this type of gear shift system/dog clutch can be controlled by a control fork (53—partially visible on FIG. 7).

Further, the gearbox 5 comprises preferably a gearbox casing 50. The gearbox casing 50 can be any type of casing/housing for enclosing the gearbox components. Typically, the gearbox casing 50 comprises two or more parts including the main casing component and a casing cover(s) (51—FIG. 2/FIG. 5).

As further shown in FIGS. 1 and 2, the primary shaft 10 extends longitudinally between a first axial end 101 and a second axial end 102. Both axial ends (101, 102) of the primary shaft 10 can be rotationally mounted within the gearbox casing 50. The mounting can be provided via a first primary roller bearing 41 arranged at the first axial end 101, and via a second primary roller bearing 42 arranged at the second axial end 102. The roller bearings (41, 42), disposed between the gearbox casing 50 and the primary shaft 10 at both axial ends (101, 102), help to withstand high torque values and to minimize wear of the primary shaft 10.

The auxiliary shaft 20 extends longitudinally between a first auxiliary axial end 201 and a second auxiliary axial end 202. Both auxiliary axial ends (201, 202) can be rotationally mounted within the gearbox casing 50. The mounting can be provided via a first auxiliary roller bearing 46 arranged at the first auxiliary axial end 201, and via a second auxiliary roller bearing 47 arranged at the second auxiliary axial end 202. The auxiliary roller bearings (46, 47) disposed between the gearbox casing 50 and the auxiliary shaft 20 at both auxiliary axial ends (201, 202) help to withstand high torque values and to minimize wear of the auxiliary shaft 20.

The gearbox 5 has an axial length LG. The axial length LG can be taken along the first axis A1. The axial length LG can be thus interpreted as an overall length of the gearbox 5 in the axial direction of the first axis A1. The axial length LG can further incorporate the dimensions of the gearbox casing 50, including the cover(s) 51. The total axial length LG of the gearbox 5 is less than 400 mm. This compactness is achieved thanks to the output gear 3 being independently and rotationally disposed around the primary shaft 10 such that the output gear 3 rotates around the first axis A1, as the primary shaft 10. The axial length LG, being less than 400 mm, defines high compactness of the gearbox 5, which can be accommodated in various types of electric/hybrid vehicles where the strict space requirements are key features.

As further shown in FIGS. 1-2, the primary shaft 10 can be defined by diameters D1-D4, wherein the diameter D1 is measured at the first axial end 101 of the primary shaft 10 and the diameter D4 is measured at the second axial end 102 of the primary shaft 10. The diameters D2 and D3 are inner diameters of the primary shaft 10. All the diameters D1-D4 may vary. The diameter D1 represents the minimal structural diameter of the primary shaft 10, which ensures the structural strength of the primary shaft 10. The diameter D1 is preferably at least 40 mm. The diameter D4 is preferably 70 mm. Further, the diameter D3 defines the diameter of the primary shaft 10 in the area on which the output gear 3 is mounted and is preferably about 85 mm. The diameter D2 defines the diameter of the primary shaft 10 in the area on which the transmission gear 13 is mounted and is preferably about 60 mm. In addition, a length L10 of the primary shaft 10 is defined as the total length of the primary shaft 10 along the first axis A1. The length L10 is preferably about 250 mm.

Similarly, the auxiliary shaft 20 can be further defined by diameters D25-D29, wherein the diameter D25 is measured at the first auxiliary axial end 201 of the auxiliary shaft 20 and the diameter D29 is measured at the second auxiliary axial end 202 of the auxiliary shaft 20. The diameters D26-D28 are inner diameters of the auxiliary shaft 20. All the diameters D25-D29 may vary. The diameter D25 represents the minimal structural diameter of the auxiliary shaft 20 which ensures the structural strength of the auxiliary shaft 20. The diameter D25 is preferably equals to at least 34 mm. The diameter D29 is preferably about 55 mm. The particular part of the auxiliary shaft 20 where the auxiliary transmission gear 21 is rigidly fixed to the auxiliary shaft 20 can be defined by the diameter D26 and by the radius R21 of the auxiliary transmission gear 21. The diameter D26 of the auxiliary shaft 20 may thus correspond to an inner diameter (not shown) of the auxiliary transmission gear 21, such that to provide the rigid fixation, the diameter D26 of the auxiliary shaft 20 and the inner diameter of the auxiliary transmission gear 21 match the one with the other. The diameter D26 of the auxiliary shaft 20 is preferably about 80 mm.

Similarly, the particular part of the auxiliary shaft 20 where the auxiliary output gear 22 is rigidly fixed to the auxiliary shaft 20 can be defined by the diameter D28 of the auxiliary shaft 20 and by the radius R22 of the auxiliary output gear 22. The diameter D28 of the auxiliary shaft 20 may thus correspond to an inner diameter (not shown) of the auxiliary output gear 22, such as to provide the rigid fixation, meaning that the diameter D28 of the auxiliary shaft 20 and the inner diameter of the auxiliary output gear 22 matches with each other. The diameter D28 of the auxiliary shaft 20 is preferably about 108 mm. In addition, the part of the auxiliary shaft 20 between the auxiliary transmission gear 21 and the auxiliary output gear 22 may define the diameter D27. The diameter D27 of the auxiliary shaft 20 is preferably about 95 mm. A length L20 of the auxiliary shaft 20 is defined as the total length of the auxiliary shaft 20 along the second axis A2. The length L20 is preferably about 200 mm.

Figure 3:
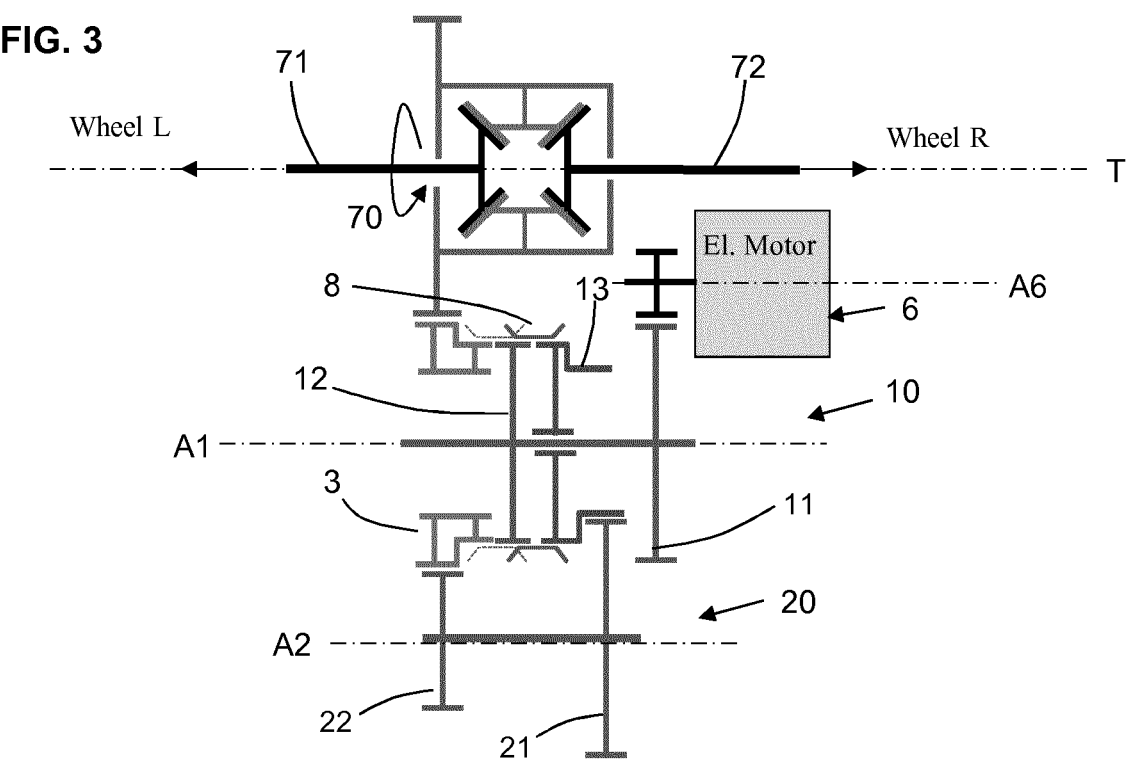
FIG. 3 shows a schematic drawing of the gearbox of FIGS. 1-2.

Referring to FIG. 3, it shows a schematic drawing of the embodiment presented above with the transmission gear 13 and thee auxiliary transmission gear 21. In addition to the FIGS. 1 and 2, FIG. 3 further shows a motor 6, typically an electric motor having a motor axis A6. The motor axis A6 is the axis of rotation of the rotor. The gearbox 5 can be further engaged to the differential assembly and more particularly, to the differential ring wheel 70 of the differential assembly which further transmits the power to a left drive wheel shaft 71 and a right drive wheel shaft 72 extending generally along a drive wheel axle T. Each of the left and right drive wheel shaft (71, 72) can be positioned on each respective side of the gearbox 5. The input power of the (first) electric motor 6 is transmitted through the primary input gear 11 into the gearbox 5 and transmitted out of the gearbox 5 through the output gear 3 engaged to the differential ring wheel 70.

Figure 4:
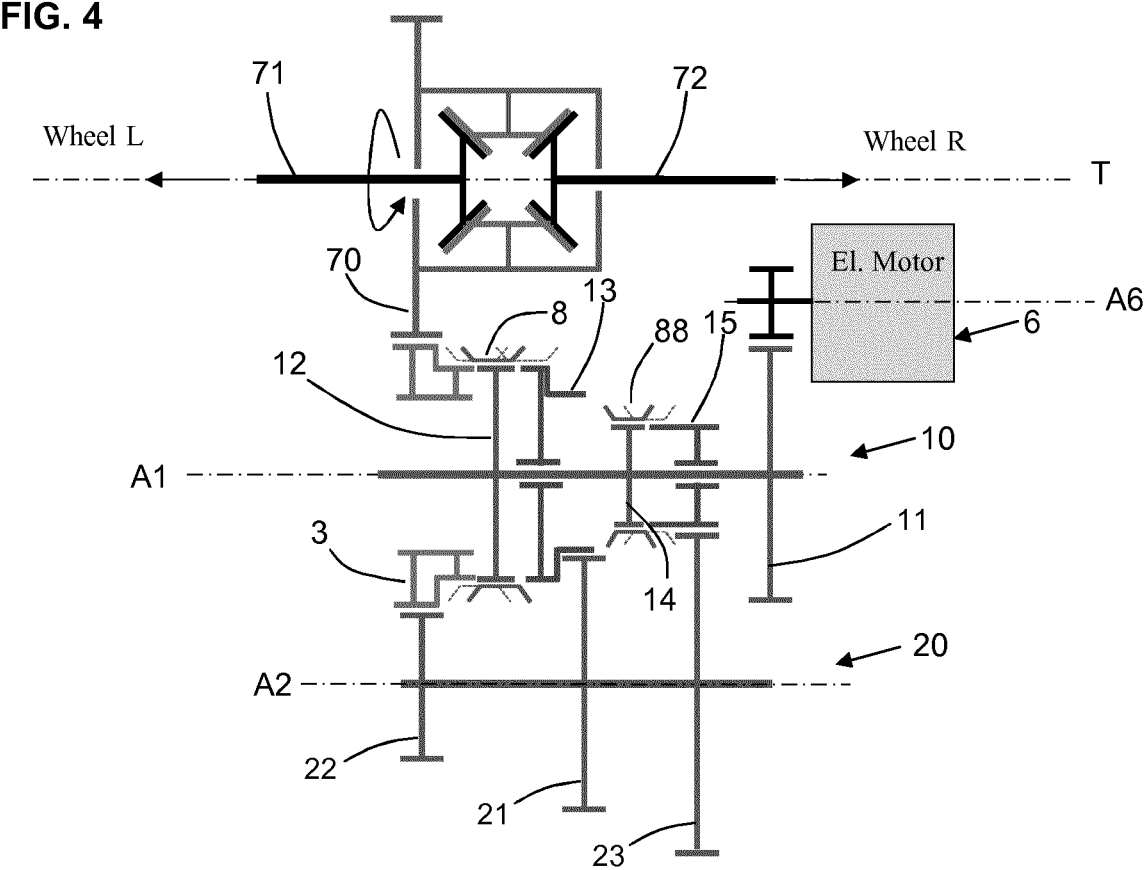
FIG. 4 shows a schematic drawing of another embodiment of the gearbox having an additional gear stage.

FIG. 4 refers to another embodiment having substantially the same features as the embodiment described in FIGS. 1-3 apart from having a second distribution gear 14, a second transmission gear 15 and a second auxiliary transmission gear 23 in addition to the distribution gear 12, transmission gear 13 and the auxiliary transmission gear 21. The function and position of the electric motor 6 is substantially the same as in previous embodiment—the electric motor 6 is engaged to the primary input gear 11 of the primary shaft 10. Similarly, the output gear 3 can be engaged to the differential assembly which transfers the power through the differential ring wheel 70 to the one or more drive wheel axles T.

As shown in FIG. 4, the primary shaft 10 is provided with a primary input gear 11 and the distribution gear 12 is as explained above. In addition, the primary shaft 10 further comprises the second distribution gear 14. The second distribution gear 14 may be rigidly fixed to or can be integral with the primary shaft 10.

The second transmission gear 15 is rotatably mounted on the first axis A1 and disposed on the primary shaft 10. In various scenarios, the second transmission gear 15 can freely rotate around the primary shaft 10. The second transmission gear 15 can have either the same, or a different rotational speed as the primary shaft 10 and the transmission gear 13, depending on the gear current selection.

Preferably, the second transmission gear 15 is mounted around the primary shaft 10 via at least a second transmission needle bearing (not shown). The at least second needle bearing disposed between the second transmission gear 15 and the primary shaft 10 provides enhanced space limitation since needle bearing requires less space than other known types of bearings and furthermore, provides enough strength to withstand the speed/torque demand of the gearbox 5.

The second distribution gear 14 is configured to transfer the power from the primary shaft 10 to the second transmission gear 15 when the second distribution gear 14 is rotatably engaged to the second transmission gear 15 by means of a second gear shift system 88 (will be explained later).

As shown in FIG. 4, the auxiliary shaft 20 comprises the auxiliary output gear 22 that is engaged to the output gear 3 and the auxiliary transmission gear 21 that is engaged to the transmission gear 13. Further, the auxiliary shaft 20 comprises the second auxiliary transmission gear 23. The second auxiliary transmission gear 23 can be rigidly fixed to or can be integral with the auxiliary shaft 20. In this configuration, the auxiliary output gear 22, the auxiliary transmission gear 21 and the second auxiliary transmission gear 23 rotate together around the second axis A2 at the same speed as the auxiliary shaft 20. The second auxiliary transmission gear 23 is engaged to the second transmission gear 15.

The gearbox 5 of the embodiment of FIG. 4 further comprises the second gear shift system 88. The second gear shift system 88 is configured to be slidable between at least two positions. The at least two positions can be defined as different engagement configurations between the second distribution gear 14 of the primary shaft 10 and the second transmission gear 15.

Firstly, the second gear shift system 88 can be engaged solely with the second distribution gear 14. In this configuration, the second gear shift system 88 do not have any engagement configuration with the second transmission gear 15. The engagement of the second gear shift system 88 with only the second distribution gear 14 can be defined as a second neutral position. In the second neutral position, the second gear shift system 88 is configured to transmit no power between the primary input gear 11 and the output gear 3 through the second distribution gear 14 (and the second transmission gear 15) since no physical engagement between these gears (14, 15) is provided.

Secondly, the second gear shift system 88 can be shifted from the second neutral position to the rotational engagement between the second distribution gear 14 and the second transmission gear 15. In this engagement configuration, the rotational speed of the second transmission gear 15 is the same as the rotational speed of the second distribution gear 14. The power in this configuration is distributed indirectly from the primary shaft 10 (connected to the (first) electric motor 6) to the output gear 3, through the auxiliary shaft 20 (via the second distribution gear 14 and the second transmission gear 15 being engaged to the second auxiliary transmission gear 23).

The power of the electric motor 6 is thus transmitted radially through the primary input gear 11 to the primary shaft 10, then through the second distribution gear 14 to the second transmission gear 15 via the second gear shift system 88 and then, the power is distributed from the second auxiliary transmission gear 23 rotatably engaged to the second transmission gear 15 to the auxiliary output gear 22 via the auxiliary shaft 20. Finally, the power is transmitted from the auxiliary output gear 22 to the output gear 3 and then radially to the differential assembly (e.g. to the differential ring wheel 70).

In this configuration of the second gear shift system 88, the rotational speed of the output gear 3 is further reduced compared to the rotational speed of the output gear 3 in the second configuration defined above with respect to the indirect engagement via the gear shift system 8 as shown in FIG. 1. Therefore, such configuration can be selected in high-torque/low-speed conditions.

Additionally, in the scenario where the second gear shift system 88 rotationally engages the second distribution gear 14 and the second transmission gear 15, the gear shift system 8 has to be in the (first) neutral position to provide no engagement between the distribution gear 12 and either the output gear 3 or the transmission gear 13. Similarly, in the scenario where the gear shift system 8 rotationally engages either the output gear 3 or the transmission gear 13 with the distribution gear 12, the second gear shift system 88 has to be in the second neutral position (solely in engagement with the second distribution gear 14). Furthermore, in various scenarios, both the gear shift system 8 and the second gear shift system 88 can be positioned in their first/second neutral positions to provide free movement of a vehicle, such as a free movement of the drive wheel shafts/axle for towing or servicing a vehicle/trailer.

Further, the second gear shift system 88 can be a type of clutch sleeve or any suitable type of dog clutch for performing gear change in the gearbox 5.

Advantageously, even if the second distribution gear 14, second transmission gear 15 and the second auxiliary transmission gear 23 is provided within the gearbox 5, the gearbox 5 exhibits the axial length LG which is less than 500 mm, preferably less than 450 mm. Therefore, even if the gearbox 5 provides the additional gear stages (in terms of additional distribution/transmission/auxiliary transmission gears), the primary input gear 11 of the primary shaft 10 and the output gear 3 remains at the substantially same position in terms of vertical arrangement with respect to the auxiliary shaft 20. This means that the distance between the primary shaft 10 and the auxiliary shaft 20 remains unchanged when one or more additional gear stages are added.

In addition, further to the first and second gear ratios defined above, the embodiment of FIG. 4 can be defined in relation to a third gear ratio as the quotient between the rotational speed of the primary input gear 11 and the rotational speed of the output gear 3. The first gear ratio is the quotient between the rotational speed between the primary input gear 11 and the rotational speed of the output gear 3 (in the direct engagement configuration between the distribution gear 12 and the output gear 3). The second gear ratio is the quotient between the rotational speed of the primary input gear 11 and that of the output gear 3 (in the indirect engagement between the distribution gear 12 and the output gear 3: the power is transmitted through the transmission gear 13 to the auxiliary shaft 20.

Additionally, the third gear ratio can be defined in the case the second gear shift system 88 is in position defining the rotational engagement between the second distribution gear 14 and the second transmission gear 15. The power in this configuration is distributed indirectly from the primary shaft 10 (the primary input gear 11) to the output gear 3 through the auxiliary shaft 20 (via the second distribution gear 14 and the second transmission gear 15 being engaged to the second auxiliary transmission gear 23). The third gear ratio is thus the quotient between the rotational speed of the primary input gear 11 and the rotational speed of the output gear 3 (in engagement between the second distribution gear 14 and the second transmission gear 15, while the gear shift system 8 is in its (first) neutral position).

Preferably, the third gear ratio (engagement between the second distribution gear 14 and the second transmission gear 15) is higher than the second gear ratio (engagement between the distribution gear 12 and the transmission gear 13). Additionally, the second gear ratio is preferably higher than the first gear ratio (engagement between the distribution gear 12 and the output gear 3).

Figure 5:
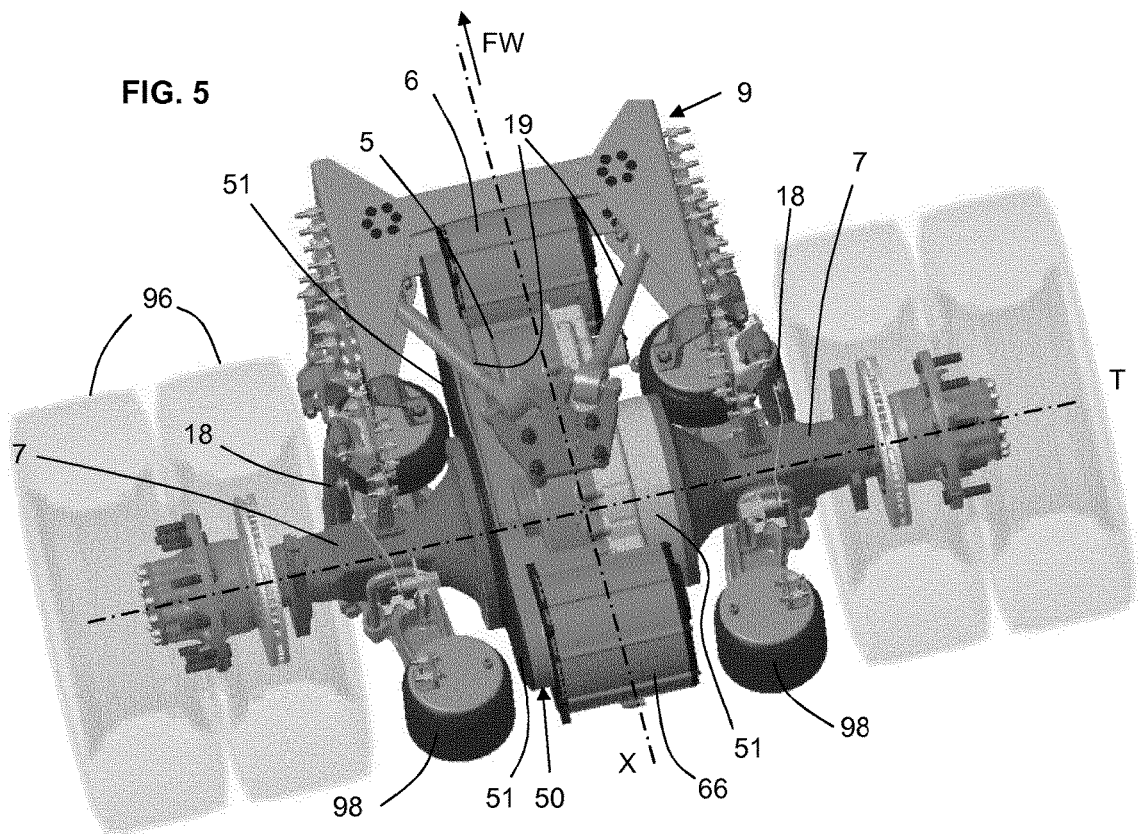
FIG. 5 shows a perspective view of a powertrain assembly of one embodiment according to the present disclosure.

FIG. 5 shows a perspective view of a powertrain assembly. The powertrain assembly comprises the gearbox 5 having the casing 50, one or two electric motor(s) (6, 66), and the differential assembly engaged to the gearbox 5. The casing 50 of the gearbox 5 can be any type of casing/housing for enclosing the gearbox components and typically comprises two or more parts including the main casing component and the casing cover(s) 51.

The powertrain assembly can further comprise the drive wheel axle T through which the power can be transmitted from the gearbox 5 to driving wheels 96 of a vehicle. The drive wheel axle T can be further defined by the left drive wheel shaft 71 and a right drive wheel shaft 72, both enclosed in an axle body/case 7. Each of the left and right drive wheel shafts (71, 72) can be positioned on each respective side of the gearbox 5 with respect to an axis X (axis in a longitudinal direction of a vehicle).

As further shown in FIG. 5, the powertrain assembly can be directly or indirectly engaged to a suspension system of a vehicle, defined for instance by pneumatic cylinders (98, 99). The pneumatic cylinders (98, 99) might also represent other types of cylinders, for instance, cylinders for any auxiliary device which is specific for a particular vehicle. The powertrain assembly can be further connected to a vehicle's chassis 9 for more rigid configuration. As exemplarily shown in FIG. 5, the powertrain assembly can be attached to the chassis 9 through one or more struts 18, 19 (e.g. shock absorbers for vertical 18 and horizontal 19). The struts (18, 19) can be any type of suitable strut for limiting vibrations and shocks.

Figure 6:
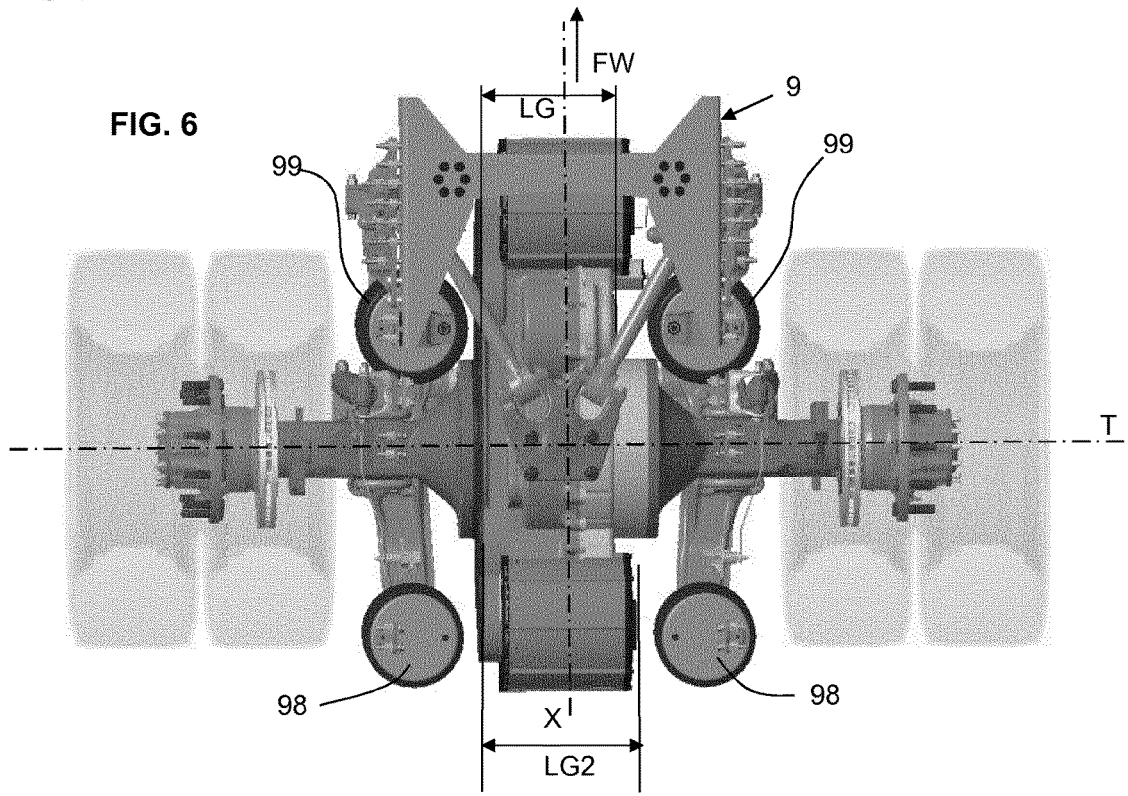
FIG. 6 shows a top view of the powertrain assembly of FIG. 5

FIG. 6 represents a top view of the powertrain assembly depicted in FIG. 5. As shown therein, the axis X is defined in a longitudinal direction of a vehicle and the drive wheel axle T is perpendicular to the axis X. As further depicted, an arrow FW defines a direction where a front part of a vehicle is positioned (e.g. a cabin or a front steering wheel axle). As explained with respect to FIG. 2, the gearbox 5 exhibits the axial length LG which is defined as the length of the gearbox 5 measured along the drive wheel axle T (or along the first axis A1 being parallel with the drive wheel axle T).

More particularly, the axial length LG is a length of the gearbox 5 as such, taken along the first axis A1/drive wheel axle T without considering the dimensions of the one or two electric motor(s) (6, 66). The axial length LG of the gearbox 5 is less than 400 mm, preferably about 360 mm. The gearbox 5 or more particularly, the gearbox 5 and the one or two electric motor(s) (6, 66), when engaged together, might further define a second axial length LG2 dimension which is defined as a length along the first axis A1/drive wheel axle T. The second axial length LG2 is preferably about 400 mm.

The gearbox 5 which is defined either by the axial length LG or the second axial length LG2 can provide a high level of compactness and can be fitted within the existing chassis 9/suspension systems of a vehicle.

Figure 7:
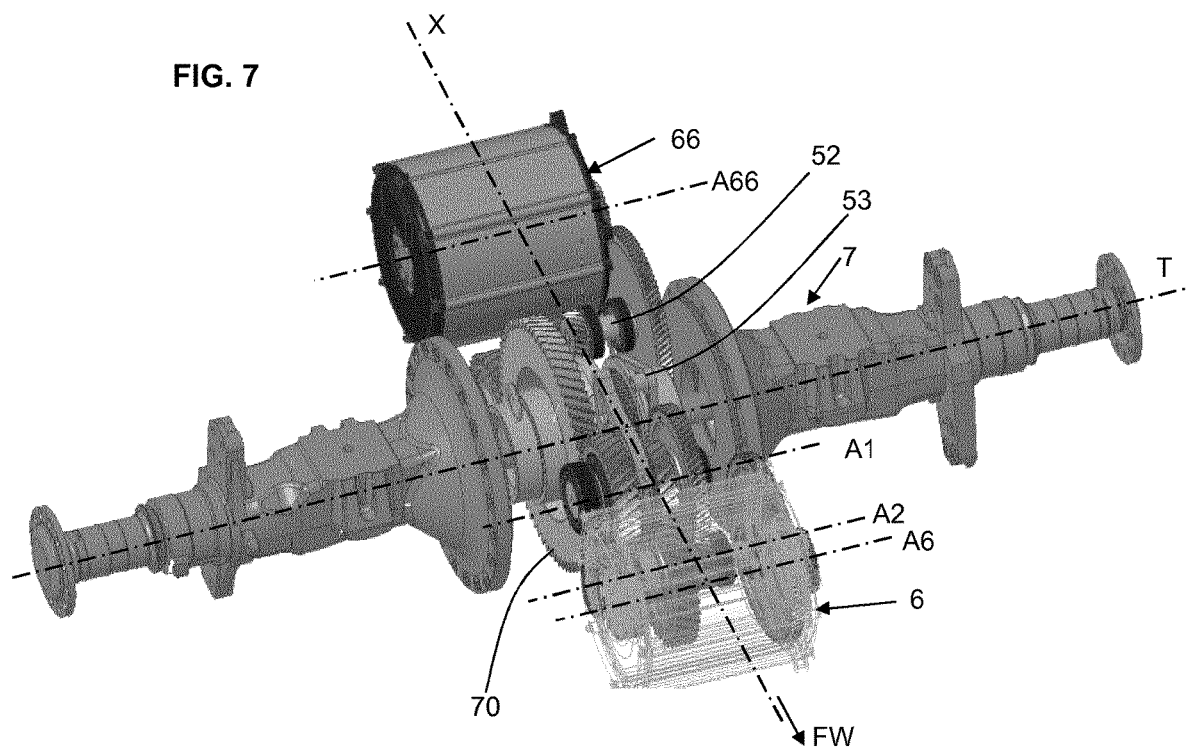
FIG. 7 shows a perspective view of the powertrain assembly of FIG. 5.
Figure 9:
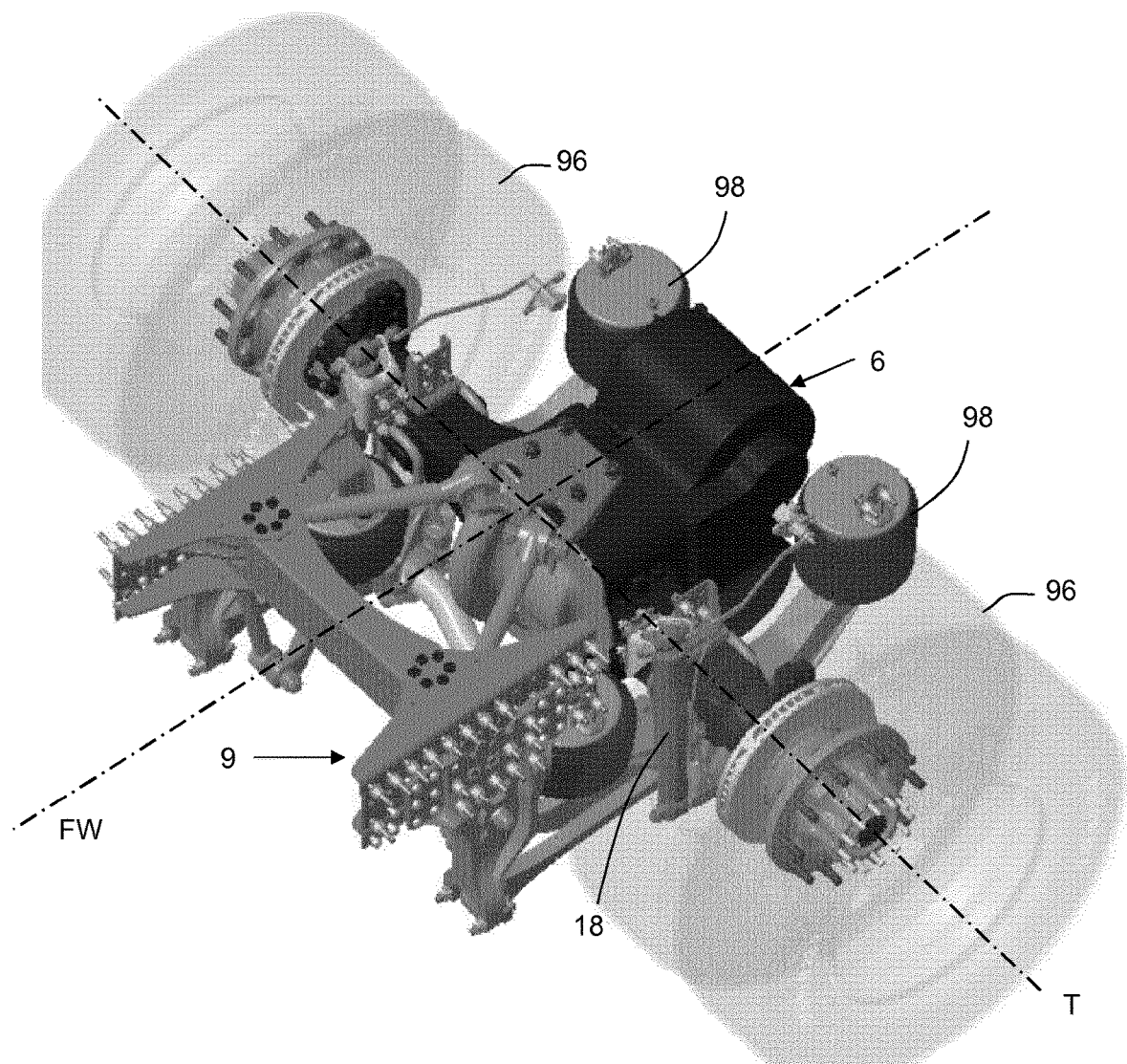
FIG. 9 shows a perspective view of another embodiment of the powertrain assembly.

FIG. 7 shows a perspective view of the powertrain assembly without depicting the rotational wheels 96 of a vehicle, chassis 9, struts 19, pneumatic cylinders (98, 99) and the suspension system. Further, the gearbox 5 is depicted without casing 50 and casing cover(s) 51. The example shown in FIG. 7 represents an embodiment having two electric motors (6, 66), however for the sake of limited room/space for the gearbox 5 in some types of vehicles, a single electric motor 6 embodiment is preferable—as shown in FIG. 9.

FIG. 7 further shows the (first) motor axis A6 of the (first) electric motor 6. The (first) motor axis A6 defines the axis about which a rotor of the (first) electric motor 6 is rotatable. Similarly, a (second) motor axis A66 is defined as the axis of the (second) electric motor 66 and represents the axis about which a rotor of the (second) electric motor 66 is rotatable. The position of two electric motors (6, 66) in FIG. 7 is an exemplary configuration and might differ depending on the type of vehicle. For instance, due to the suspension assembly and chassis 9, the position of the (first) electric motor 6 might vertically differ with respect to the position of the (second) electric motor 66.

The gearbox 5 configuration shown in FIG. 7 represents the embodiment of FIG. 4 having two distribution gears (distribution gear 12, second distribution gear 14), two transmission gears (transmission gear 13, second transmission gear 15), and two auxiliary transmission gears (auxiliary transmission gear 21, second auxiliary transmission gear 23) engaged to the (first) electric motor 6. In the exemplary embodiment shown in FIG. 7, the (second) electric motor 66 is not engaged to a gearbox but to a reducer 52 engaged to the differential assembly. The reducer has a fixed gear ratio (which cannot be changed then). The powertrain assembly may further comprise the control fork 53 for selectively locking/unlocking the differential assembly. In other embodiments (not shown), the reducer 52 may be omitted and both electric motors (6, 66) may be engaged to two respective gearboxes.

As shown in FIG. 7, the (first) electric motor 6 is configured to be engaged to the primary input gear 11 of the gearbox 5. The power is thus transmitted through the primary input gear 11 to the primary shaft 10 of the gearbox 5. The differential assembly can be defined as comprising a differential gear having a differential ring wheel 70. The differential ring wheel 70 can be rotatably engaged to the output gear 3 of the gearbox 5 for transmitting the power out of the gearbox 5 to the one or more drive wheel axles T. As explained above, the drive wheel axle T can be defined by the left drive wheel shaft 71 and a right drive wheel shaft 72. Each of the left and right drive wheel shaft (71, 72) can be positioned on each respective side of the gearbox 5 such that each of the left and right drive wheel shaft (71, 72) is coupled to the differential crown wheel of the differential assembly.

Figure 8:
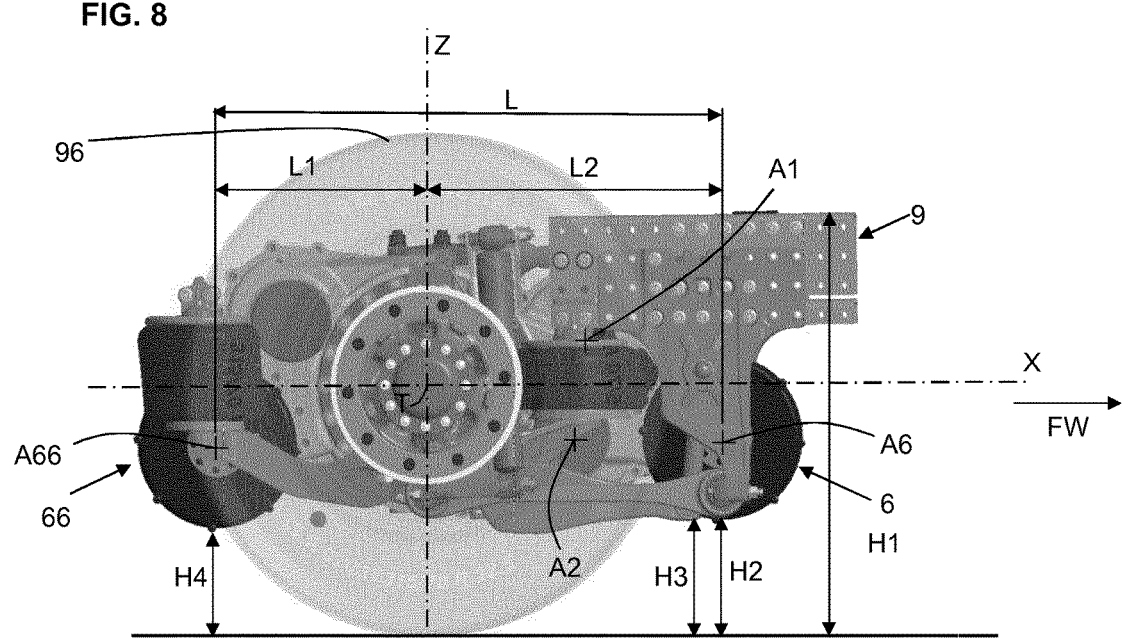
FIG. 8 depicts a side view of the powertrain assembly of FIG. 5.

FIG. 8 depicts a side view of the powertrain assembly defined above. As shown therein, the powertrain assembly represents the embodiment having two electric motors (6, 66) disposed on each respective side with respect to the drive wheel axle T. The compactness of the powertrain assembly having the compact gearbox 5 is further demonstrated by height/clearances defined as H1-H4 and lengths defined as L, L1, and L2. The axis X defines the axis in a longitudinal direction of a vehicle whereas the arrow FW defines a direction where a front part of a vehicle is positioned (e.g. a cabin or a front steering wheel axle). An axis Z defines the vertical axis which is perpendicular to the axis X and to the drive wheel axle T.

The height H1 represents a vertical distance along the Z-axis from the ground to the upper part of the chassis 9 of a vehicle. The second clearance H2 represents a vertical distance along the Z-axis from the ground to the lowest part of the (second) electric motor 66. The third clearance H3 represents a vertical distance along the Z-axis from the ground to the lowest part of the suspension assembly (e.g. to a suspension arm). The fourth clearance H4 represents a vertical distance along the Z-axis from the ground to the lowest part of the (first) electric motor 6.

The length L represents a longitudinal distance along the X-axis between the (first) motor axis A6 of the (first) electric motor 6 and the (second) motor axis A66 of the (second) electric motor 66. Further, the length L1 represents a longitudinal distance along the X-axis between the (first) motor axis A6 of the (first) electric motor 6 and the drive wheel axle T. The length L2 represents a longitudinal distance along the X-axis between the (second) motor axis A66 of the (second) electric motor 66 and the drive wheel axle T.

As an exemplary embodiment, the powertrain assembly can be assembled in a vehicle having the driving wheels 96 of dimensions 315/70 R22.5. The dimensions of the driving wheels 96 are not limiting: They give an idea of the overall dimension and compactness of the transmission assembly shown in FIG. 8.

Preferably, the height H1 is preferably about 859 mm (tbc). The clearance H2 is preferably about 217 mm (tbc). The clearance H3 is about 230 mm (tbc). The clearance H4 is preferably about 229 mm (tbc). The length L is preferably about 1074 mm. The length L1 is preferably about 470 mm. The length L2 is preferably about 633 mm.

Thanks to the small dimensions of the gearbox 5 as such and the powertrain assembly incorporating the gearbox 5, the high level of compactness is achieved. For instance, if the powertrain assembly is incorporated in a heavy truck vehicle, the clearance between the chassis 9 and the gearbox 5 enables to withstand heavier loads and in case the gearbox 5 is engaged to the suspension assembly, the vehicle can withstand much higher vibration and absorb higher shocks due to high level of movement provided to the drive wheel axle T. Such high level of movement is provided thanks to the available room (space) between the powertrain assembly and the other parts of a vehicle (e.g. the chassis 9, suspension assembly, batteries, etc.)

FIG. 9 shows a preferred embodiment which is substantially the same as embodiments of FIGS. 5-8 apart from the presence of one (first) electric motor 6 only. This embodiment further enhances the compactness of the gearbox 5 as such and the compactness of the powertrain assembly within a vehicle.

Figure 10:
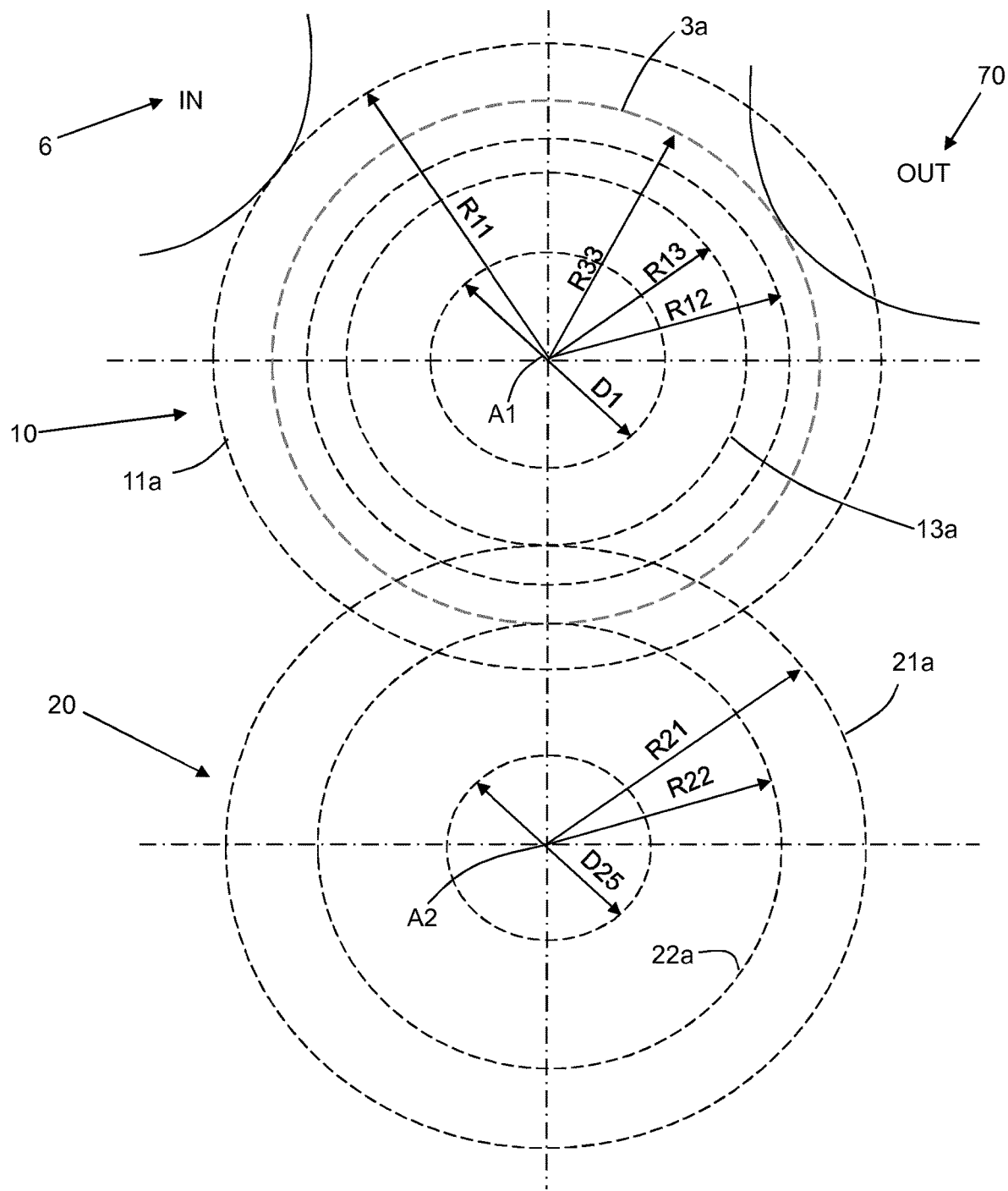
FIG. 10 shows a schematic diagram illustrating in cross-sectional view various radii involved in the gearbox of FIG. 1.

FIG. 10 represents the schematic diagram illustrating in cross-sectional view various radii involved in the gearbox 5, along the first/second axis (A1, A2). As identified in FIGS. 1-2 and 10, the primary shaft 10 can be further defined by radiuses R11, R12 of the primary input gear 11 and the distribution gear 12, by the diameters D1-D4 and furthermore by the length L10. Similarly, the auxiliary shaft 20 can be further defined by radiuses R21, R22 of the auxiliary transmission gear 21 and the auxiliary output gear 22, by the diameters D25-D29 and by the length L20.

In various embodiments, the diameters of the first/auxiliary shaft (10, 20) may differ as well as the radiuses of the gears (3, 13, 15, 21, 22, 23). Therefore, substantially any gear ratio is possible by changing the radiuses/diameters of the gears (3, 13, 15, 21, 22, 23). The rotational speed of the output gear 3 can be presented as Ω3, and as well known in prior-art, the rotational speed Ω3 can be determined using the following formula:

$$\Omega 3 = \Omega 1 (R13/R21)(R22/R33);$$

where Ω1 is rotational speed of the input gear (e.g. in case of indirect engagement, the input gear can be presented as transmission gear 13 having the same rotational speed as the primary shaft 10/primary input gear 11), R13 is the radius of the transmission gear 13, R21 is the radius of the auxiliary transmission gear 21, R22 is the radius of the auxiliary output gear 22 and R33 is the radius of the output gear 3. Therefore, by changing the individual radiuses of the formula above, different gear ratio can be achieved.

Additionally, the radius R11 of the primary input gear 11 is preferably about 166 mm. The radius R12 of the distribution gear 12 is preferably about 86 mm. Advantageously, according to another example, the rotational speed Ω3 may be lower than Ω1 (reduced gear ratio), or may be higher as compared to Ω1 (amplified gear ratio).

As further shown in FIG. 10, outer surfaces (11a, 13a, 21a, 22a, 3a) of the primary input gear 11, the transmission gear 13, the auxiliary transmission gear 21, the auxiliary output gear 22 and the output gear 3 are shown as being engaged to one another, or being engaged to either the input (e.g. the electric motor 6) or to the output (e.g. the differential ring wheel 70). More particularly, the outer surface 11a of the primary input gear 11 is engaged to the outer surface of the rotor of the electric motor 6. The outer surface 13a of the transmission gear 13 is engaged to the outer surface 21a of the auxiliary transmission gear 21. Further, the outer surface 22a of the auxiliary output gear 22 is engaged to the outer surface 3a of the output gear 3. The output gear 3 is further engaged by its outer surface 3a to the differential ring wheel 70 of the differential assembly.

Advantageously, the outer surfaces (11a, 13a, 21a, 22a, 3a) of the corresponding wheels might exhibit helical-type teeth. The helical-type teeth effectively reduce noise generated by the gearbox 5 during its operation.

Furthermore, the gearbox 5 as described above and the powertrain assembly incorporating such gearbox 5 is capable to transmit a power of at least 250 kW, more preferably, the transmitted power can be at least 300 kW. As regards the transmitted torque, the gearbox 5 or the transmission assembly incorporating such gearbox 5 is capable to transmit a torque of at least 600 N·m, preferably at least 750 N·m.

The gearbox 5 and the transmission assembly described above thus represent a compact solution for various types of vehicles, preferably for the electric/hybrid vehicles such as electric/hybrid trucks or buses. The gearbox 5 (and transmission assembly) might be also suitable for trailers as an additional source of power, independent from the power of a towing vehicle to provide additional traction in specific conditions. Thanks to the small axial length of the gearbox 5, the gearbox 5 can be fitted into the electric/hybrid vehicles of various dimensions whereas the space required for other parts (batteries, body/aerodynamic devices, suspension assemblies) is not limited. The detailed description thus proposes a solution for small, compact and light gearboxes 5 for various types of vehicles.

The invention claimed is:

1. A gearbox for a vehicle comprising:
a gearbox casing;
a primary shaft having a primary input ring fixed in rotation with the primary shaft, the primary shaft being configured to rotate around a first axis, the primary shaft having first and second axial ends rotationally mounted within the gearbox casing;
a distribution spline formed at the primary shaft;
a transmission gear, which is configured to rotate around the first axis and which is arranged around the primary shaft;
an auxiliary shaft configured to rotate around a second axis, the first axis and the second axis being spaced from each other,
an auxiliary output gear and an auxiliary transmission gear which are arranged around the auxiliary shaft, said auxiliary transmission gear being engaged to the transmission gear;
an output gear for transmitting a power out of the gearbox, said output gear being independently and rotationally arranged around the primary shaft and being configured to rotate around the first axis, said output gear being located between the first and second axial ends of the primary shaft and engaged to the auxiliary output gear; and
a first gear shift system slidable between at least two positions, said first gear shift system being configured to rotationally engage at least one of:
the distribution spline and the output gear for transmitting the power directly from the primary shaft to the output gear, and
the distribution spline and the transmission gear for transmitting the power indirectly from the primary shaft to the output gear through the auxiliary shaft.

2. The gearbox of claim 1, wherein the distribution spline is rigidly fixed to the primary shaft.

3. The gearbox of claim 1, wherein at least one of the auxiliary transmission gear and the auxiliary output gear is rigidly fixed to the auxiliary shaft.

4. The gearbox of claim 1, wherein the primary shaft is rotationally mounted within the gearbox casing via a first primary roller bearing arranged at the first axial end and via a second primary roller bearing arranged at the second axial end.

5. The gearbox of claim 1, wherein an axial length of the gearbox, measured along the first axis, is less than 400 mm.

6. The gearbox of claim 1, wherein the output gear is mounted via at least one output roller bearing on the primary shaft.

7. The gearbox of claim 1, wherein the transmission gear is mounted via at least one roller bearing on the primary shaft.

8. The gearbox of claim 1, wherein the ratio between the rotational speed of the primary shaft and the rotational speed of the output gear can be selected between:
a first gear ratio when the distribution spline and the output gear are rotationally engaged; and
a second gear ratio when the distribution spline and the transmission gear are rotationally engaged,
wherein the second gear ratio is higher than the first gear ratio.

9. The gearbox of claim 1, wherein the first gear shift system is further configured to be positioned in engagement only with the distribution spline to define a first neutral position, in which no power can be transmitted between the primary shaft and the output gear.

10. The gearbox of claim 9, further comprising:
a second distribution spline being integral with the primary shaft;
a second transmission gear being rotatably mounted on the first axis and disposed on the primary shaft;
a second auxiliary transmission gear being disposed on said auxiliary shaft and engaged to the second transmission gear; and
a second gear shift system slidable between at least two positions, said second gear shift system being configured to rotationally engage at least one of the following:
solely the second distribution spline to define a second neutral position, said second neutral position transmitting no power between the primary input gear and the output gear through the second distribution spline; and
the second distribution spline and the second transmission gear for transmitting the power indirectly from the primary shaft to the output gear through the auxiliary shaft, wherein said first gear shift system is configured to be positioned in said first neutral position.

11. The gearbox of claim 1, wherein the gearbox is capable of transmitting a power of at least 250 kW and wherein the gearbox is capable of transmitting a torque of at least 600 N·m.

12. The gearbox of claim 1, wherein at least one of the first gear shift system and second gear shift system comprises a shift sleeve.

13. The gearbox (5) of claim 1, wherein at least one of the gears is a helical gear.

14. A powertrain assembly for a vehicle comprising:
a gearbox as defined in claim 1;
at least one electric motor being configured to be engaged to the primary input gear of the gearbox;
a differential gear having a differential ring wheel, said differential ring wheel being engaged to the output gear of the gearbox; and
a drive wheel axle being coupled to the differential gear.

15. A vehicle, comprising a powertrain assembly according to claim 14.

16. The vehicle of claim 15, wherein the vehicle is at least one of a truck, a bus, and a construction machine.

17. A gearbox for a vehicle comprising:
a gearbox casing;
a primary shaft having a primary input ring fixed in rotation with the primary shaft, the primary shaft being configured to rotate around a first axis, the primary shaft having first and second axial ends rotationally mounted within the gearbox casing;
a distribution gear formed at the primary shaft;
a transmission gear, which is configured to rotate around the first axis and which is arranged around the primary shaft;
an auxiliary shaft configured to rotate around a second axis, the first axis and the second axis being spaced from each other,
an auxiliary output gear and an auxiliary transmission gear which are arranged around the auxiliary shaft, said auxiliary transmission gear being engaged to the transmission gear;
an output gear for transmitting a power out of the gearbox, said output gear being independently and rotationally arranged around the primary shaft and being configured to rotate around the first axis, said output gear being located between the first and second axial ends of the primary shaft and engaged to the auxiliary output gear; and
a first gear shift system slidable between at least two positions, said first gear shift system being configured to rotationally engage at least one of:
the distribution gear and the output gear for transmitting the power directly from the primary shaft to the output gear, and
the distribution gear and the transmission gear for transmitting the power indirectly from the primary shaft to the output gear through the auxiliary shaft.

* * * * *